May 26, 1931. H. L. LEWIS 1,807,120
SAW
Filed March 11, 1929 2 Sheets-Sheet 1
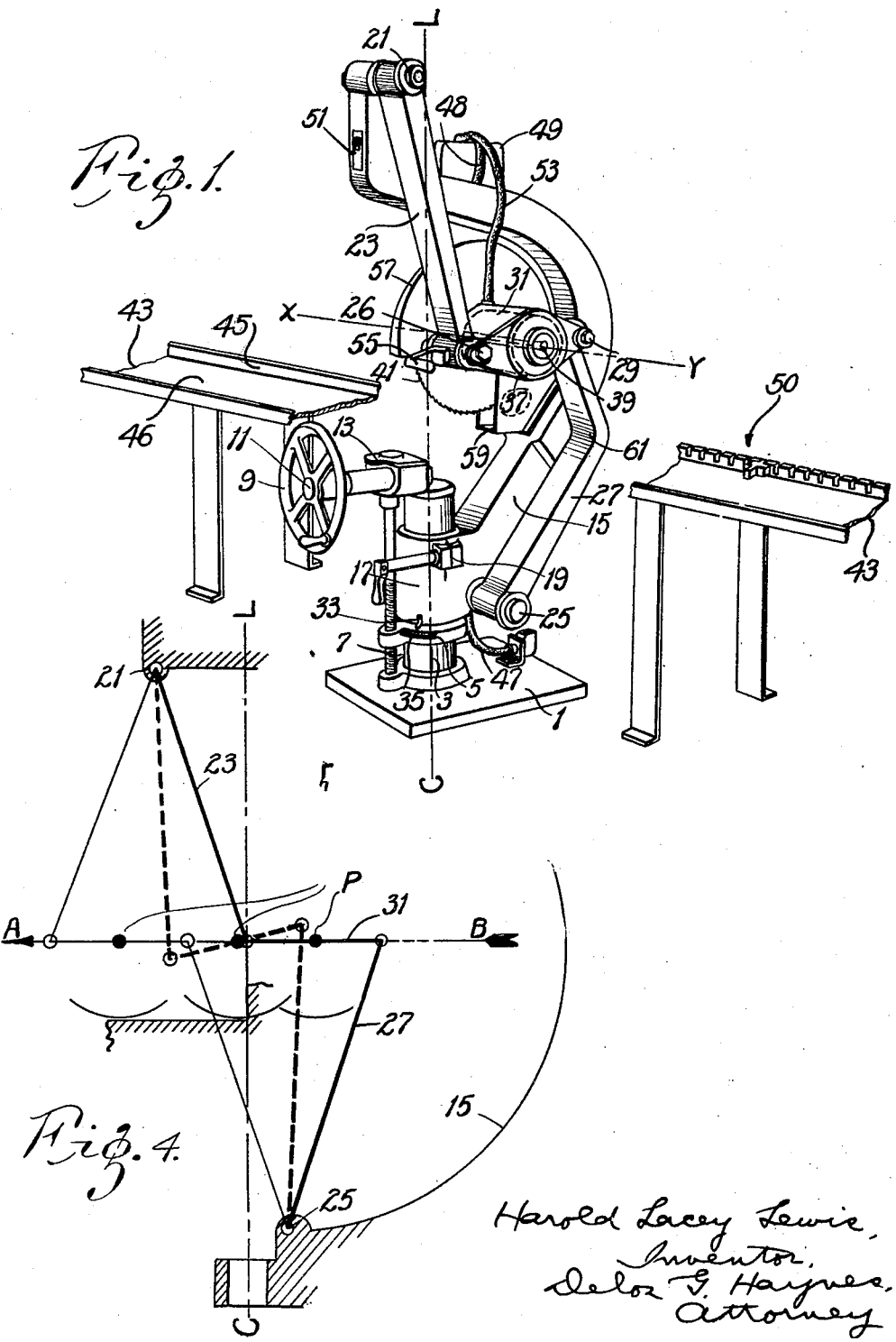

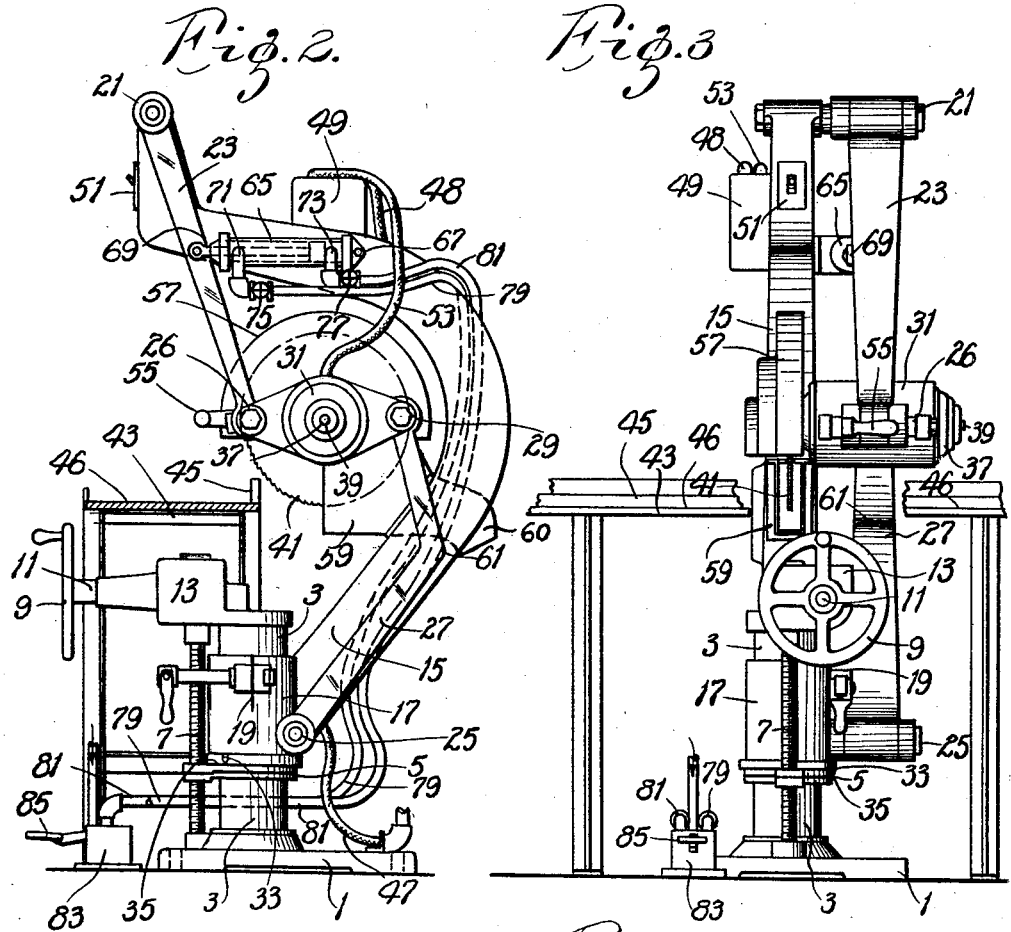

Patented May 26, 1931

1,807,120

UNITED STATES PATENT OFFICE

HAROLD LACEY LEWIS, OF ST. LOUIS, MISSOURI, ASSIGNOR TO HALL & BROWN WOOD WORKING MACHINE COMPANY, OF ST. LOUIS, MISSOURI, A CORPORATION OF MISSOURI

SAW

Application filed March 11, 1929. Serial No. 346,091.

This invention relates to saws, and with regard to certain more specific features, to straight-line, cut-off saws and similar tools.

Among the several objects of the invention may be noted the provision of a substantially straight-line, cut-off saw mechanism which eliminates the necessity for a ram work in machined guides but which uses pin joints only; the provision of a saw mechanism of the class described which uses a simple Watt straight-line mechanism for providing substantially straight-line action, said mechanism having a minimum number of parts; the provision of a device of the class described which provides for variable angle cutting across a predetermined point and the provision of a device of the class described which is compact and rugged in construction and simple in operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a perspective view showing the saw from the right hand side with the cut-off table thereof partially removed;

Fig. 2 is a side elevation of the saw per se and a cross section of the cut-off table therefor, this figure also showing an alternate method for feeding the saw;

Fig. 3 is a front elevation;

Fig. 4 is a kinematic diagram illustrating the straight line action of the saw in three alternate positions;

Fig. 5 is a diagram illustrating how angle cuts may be made across a predetermined point; and, Fig. 6 is a fragmentary side elevation showing a pneumatic check.

Similar reference characters indicate corresponding parts throughout the several views of the drawings.

Referring now more particularly to Fig. 1, there is illustrated at numeral 1 a base which includes a fixed standard 3 upon which is fitted and vertically movable a support collar 5, said support 5 being controlled in elevation by a vertical lead screw 7. Rotation of the lead screw 7 is controlled from a hand wheel 9, the shaft 11 of which is operatively geared with said screw 7 by suitable helical gears or the like mounted in a gear box 13. The gear box 13 is supported on the top of the standard 3.

Mounted on the standard 3 for horizontal rotation is a column or frame piece 15 which is supported by the collar 5. The sleeve portion 17 of the column or frame piece 15 which surrounds the standard 3 is partially split as indicated at numeral 19 and provided with a clamp screw, whereby any predetermined angular adjustment may be maintained, the elevational adjustment being maintained by the screw 7. Thus it will be seen that provision has been made for moving the column both vertically along and horizontally around a vertical center line CL. A pointer 33 associated around a vertical center line CL. A pointer 33 associated with the hub 17 traverses a scale 35 on the support 5 for indicating cutting angles.

The column 15 is substantially C-shaped, as illustrated, and is provided at the upper leg of the C-shape with a pin joint 21 upon which is supported and swung an upper swing arm 23. Likewise, there is provided at the lower leg of the C-shape a pin joint 25 for supporting a lower swing arm 27. The opposite ends of the swing arms 23 and 27 are provided with pin joints 26 and 29 respectively for the purpose of supporting a motor housing 31, said housing 31 comprising a connecting link between the swing arms 23 and 27.

As illustrated kinematically in Fig. 4 the column 15, swing arms 23 and 27 and connecting link 31 comprise a four-bar linkage arranged as a Watt approximate straight-line movement wherein the centers or joints 21 and 25 are on opposite sides of the center line CL. It should be noted that a Watt straight-line movement is herein defined as one comprising a main link such as 15 from two points on which swing arms such as 23 and 27 extend in a direction substantially toward one another, said swing arms being joined by a connecting link such as 31, which is positioned substantially laterally of the swing arms and which carries a point such as P which moves in a substantially straight-line AB. The straight-line movement holds with sufficient accuracy for approximately a twenty degree swing of the arm 23 on each side of the vertical. The deviation from a mathematically straight line is only a few thousandths of an inch for approximately a twenty inch stroke.

It will be seen from the above that if a motor, such as 37, is held by bolting or otherwise within the housing 31 with its shaft positioned along a line XY, the latter including the point P, that every point on the line XY will move in approximately a straight line or locus parallel to line AB. To the shaft 39 of the motor and to one side of the housing 31 is affixed a circular saw 41, the locus of successive positions of which comprises a straight line. Hence the lowermost tangential point on the saw will move along a straight line when the linkage is swung and hence a straight cut may be effected.

The plane P of the disc of the saw includes the vertical center line CL so that when said plane P is shifted (by swinging the frame 15 on the standard 3), said plane will always include the line CL. Hence if the work table 43 which supports the pieces to be cut has its guide plane 45 placed so as to include line CL, then angle cutting may be accomplished with maximum facility and minimum waste. It is to be understood that the work to be cut is fed along and guided by the wall or plane 45. It rests upon the substantially horizontal support 46 of the table.

As illustrated in Figs. 1 and 3, the bearings at points 21, 25, 26 and 29 are made as long as possible. They are also provided with suitable anti-friction, ball bearings adapted to prevent sideward play.

As illustrated in Fig. 1, suitable line wires 47 pass into the base of the frame 15 and up through the same (the base 15 being preferably hollow and of box section) and by way of wire 48 pass to a condulet box 49, from which connections are made to a suitable hand switch 51 and to the motor by means of a flexible lead 53. The switch 51 is in a suitable place on the frame 15 for readily and fully controlling the motor action, while a handle 55 is provided in a convenient place on link 23 for drawing forward and pushing back the motor and saw for making its substantially straight-line movement. The hand wheel 9 for adjusting the depth of cut is also placed conveniently in respect to the described controls.

A suitable guard 57 is fastened to the link 31 for partially enclosing the saw 41, the guard 57 and saw 41 being movable together. A complementary stationary guard 59 is also supported on the frame 15 for receiving and enclosing the lower and rear portion of the saw in its returned position. This member 54 also functions as a sawdust spout having an extension 60.

It should be noted that while in Fig. 4, the kinematic action is illustrated by means of diagrammatic straight lines, that in actuality the lower swing arm 27 is provided with an elbow shape 61 so that the table 43 and the supported work are cleared during action of the machine. It will be appreciated however that the particular shape that is given to the links does not affect kinematic action, inasmuch as such action depends only upon relative positioning of the centers of the linkage.

In Fig. 1 is shown said manual handle means 55 for operating the saw linkage. However, the operation can be automatically effected by the means shown in Fig. 2 in which there is shown an air cylinder 65 pinned at its rear end 67 to the frame 15. This cylinder carries a conventional sliding piston to which piston is affixed a piston rod 69, the latter being pinned at its outer end to the upper swing link 23. The pivoting is accomplished approximately at a mid-point on the link 23 so that the stroke of the saw is about double that of the rod 69.

Air pipes 71 and 73 leading to the front and rear ends of the cylinder 65 respectively are provided with adjusting globe valves 75 and 77 or the like respectively for regulating the amount of air which will flow to the respective ends of the cylinder 65. A pair of suitable flexible air hoses 79 and 81 lead from a foot control valve 83 and to the connections 71 and 73 respectively. A control pedal 85 on the valve 83 is adapted when depressed, to permit air to flow through line 81 and connection 73 to the rear end of cylinder 65, thus forcing the piston and rod forwardly. Hence the upper swing link 23 is pushed forwardly and a forward stroke of the saw effected. When the pedal 85 is released, a spring return causes it to permit air to flow to the other line 79, instead of line 81, so that air is supplied to the other end of the cylinder, thereby reversing the action to return the saw. It is to be understood that whenever the control valve 83 is set to supply air to one of the lines 79 or 81, that it also opens an exhaust for the other line, so that the other end of the cylinder 65 may exhaust. It is apparent that it is not always necessary to make a full stroke, because as soon as the foot is removed from the foot control pedal, the air enters the opposite end of the cylinder and causes the saw to return to rest position. The speed of the forward and return strokes is regulated by the adjustment of the valves 75, 77.

The advantages of this device include the following features:

In the prior art, ram type of saw, one of the difficulties was that if there was enough play for proper action when the ram was telescoped, there was apt to be too much play when the ram was placed in its extended position. Furthermore, this ram type of machine depended for a straight-line action upon the straight machined guides. As is well known, this is an expensive way of attaining a straight-line movement, the machining of the guides being relatively costly.

Applicant has improved the above construction by eliminating the guides and substituting a minimum number of pinned links. Also, in the prior art types of saws each cutting over a new angle involved cutting to a different point on the gauge used, whereas with the saw of the present invention the cut is made on the same point on the gauge regardless of the angle. The gauge is shown in the present drawings at numeral 50. It is affixed to and with suitable stops forms part of the plane guide 45.

The term "link" is referred to herein as the aggregate of the rigid portions connecting the respective centers such as 21, 26; 26, 29; 29, 25 or 25, 21; the term being referred to in its kinematic sense. As pointed out, the links themselves are given various shapes for reasons depending upon the clearances to be effected. For instance, the frame 15 is given a C-shape in order to clear the saw during its translatory movement and also to provide means whereby the table may be conveniently placed so that the center line CL passes through the plane of the work guide 45, whereby said angle cutting advantage accrues. Also, the lower swing link 27 is given the elbow shape in order to clear the work and table in its forward position.

It is also to be noted that three links joined on centers technically do not comprise a mechanism but a rigid structure, and that more than four links pinned together without quadric connections are not a mechanism because they are unconstrained in a kinematic sense. Applicant has used a mechanism comprising a single quadric chain, known as the four-bar linkage in the formation known as the Watt approximate straight-line movement and has placed the saw at the point on said movement where it will be translated in a straight line, said translation not interfering with the means for rotating the saw. Also means has been provided on the proper link for rotating the saw with minimum complication.

In Fig. 6 is shown a novel stop or check mechanism comprising an arm 2 clamped about and holding a cylinder 4 in which is located a piston 6 pressed upwardly by a spring 8, said piston having an outward extension 10 adapted to be engaged by the lower swing arm 27 when it returns to rest. A valve 12 permits free entry of air when the link 27 springs to the left, the spring 8 at this time pressing the piston 6 and associated rod 10 upwardly. Inasmuch as the valve 12 is provided with restricting outlet ports 14, the return action of the piston 6 under a return action of the swing arm 27 takes place slowly. However, unlike the case of a rubber buffer there is substantially no re-bound. The use of a pneumatic buffer in connection with a tool of this class is believed to be new.

It is apparent that other types of cut-off tools may have this invention applied thereto, such as rabbeting tools, dadoing chisels, gouges, rotary planers or the like.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A saw mechanism comprising a table, a co-operating C-frame, a pair of swing links pivoted at substantially opposite ends of said frame and extending substantially toward one another, a connecting link pivoted to the juxtaposed ends of said swing links such that a predetermined point thereon moves in a substantially straight line when the swing links are moved, a motor mounted on the connecting link, a circular saw driven by said motor, the center line of the circular saw passing through said point, one end of the C-frame extending beyond the other end thereof, the pivot point of one swing link on said extending portion being spaced beyond the pivot point for the other link, said other link having an elbow shape permitting the saw to swing forward without interference from said table.

2. A saw mechanism comprising a table, a substantially upright C-frame, a pair of swing links pivoted at substantially opposite ends of said frame and extending substantially toward one another, a connecting link pivoted to the juxtaposed ends of said swing links such that a predetermined point thereon moves in a substantially straight line when the swing links are moved, a motor mounted on the connecting link, a circular saw driven by said motor, the center line of the circular saw passing through said point, the upper end of the C-frame extending beyond the lower end thereof, the pivot point of the upper swing link being spaced beyond the pivot point for the lower swing link, said lower swing link having an elbow shape permitting the saw to swing across the table without the lower link interfering therewith.

3. A saw mechanism comprising a table, a co-operating C-frame, a pair of swing links pivoted at substantially opposite ends of said frame and extending substantially toward one another, a connecting link pivoted to the juxtaposed ends of said swing links, a rotary saw on said connecting link, one of said swing links having an elbow shape permitting saw to be swung over said table without said link interfering therewith.

4. A saw mechanism comprising a table, a frame near said table, a saw, a Watt approximate straight-line linkage for supporting said saw and moving the same in a straight line over said table, one of the links of said linkage having an elbow shape permitting the saw to cross the table without said link interfering therewith.

In testimony whereof, I have signed my name to this specification this 9th day of March, 1929.

HAROLD LACEY LEWIS.